Sept. 25, 1951 R. F. WILD 2,569,268
PHASE SENSITIVE MEASURING AND
CONTROLLING APPARATUS
Filed Aug. 13, 1947 2 Sheets-Sheet 2
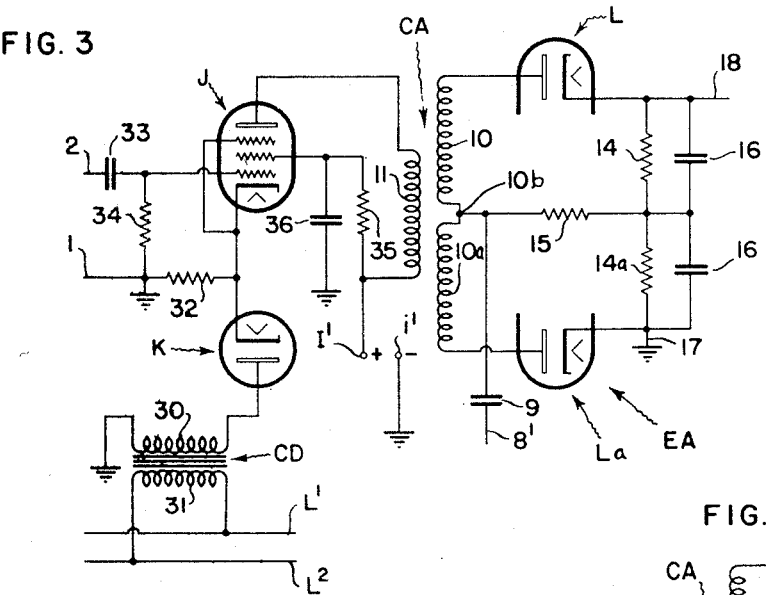
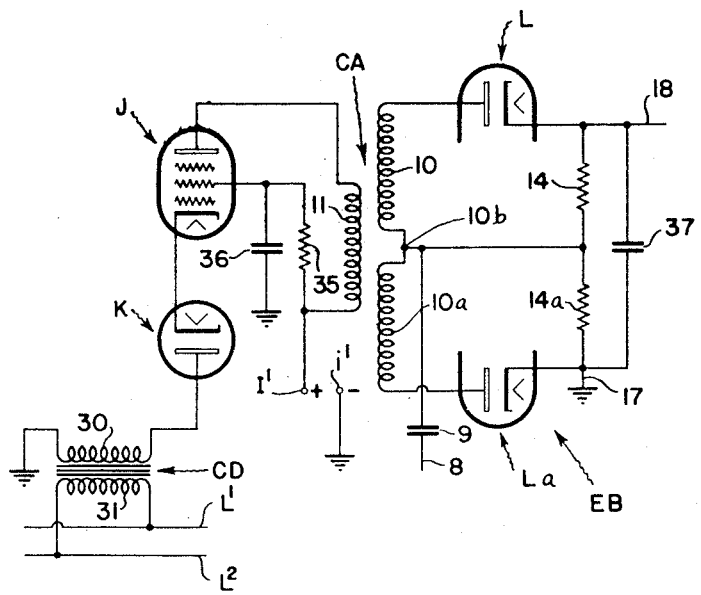
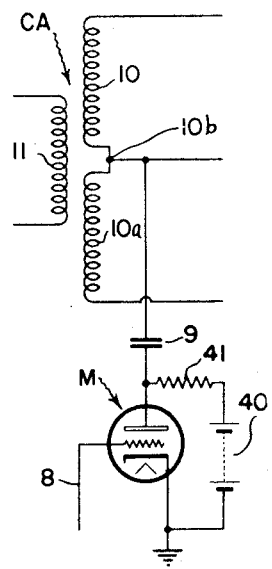
*INVENTOR.*
RUDOLF F. WILD
BY Arthur F. Swanson
ATTORNEY.

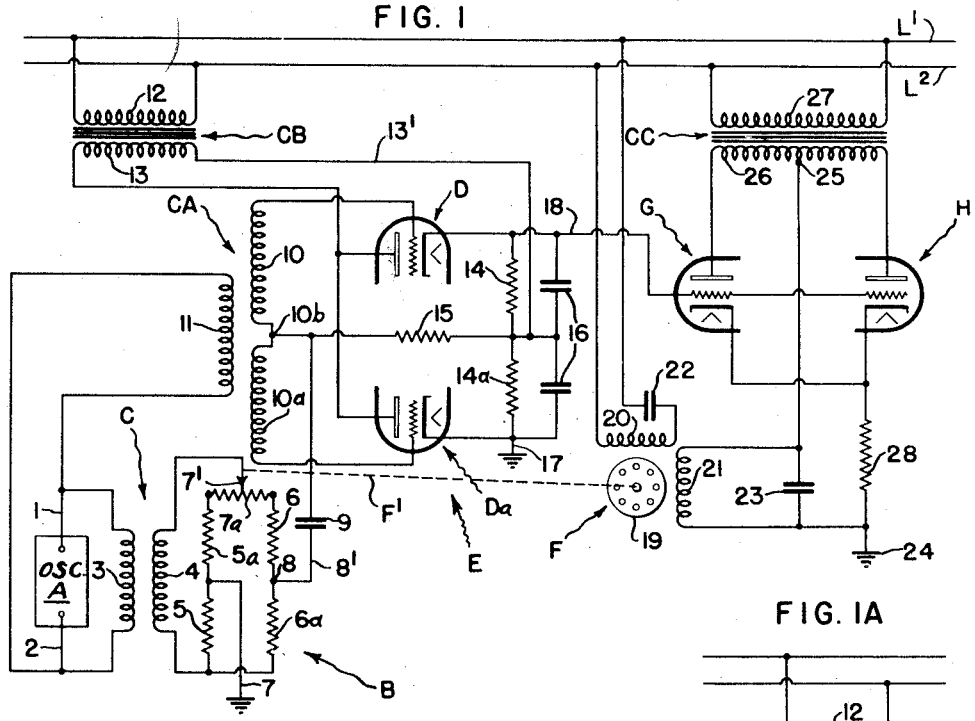

Patented Sept. 25, 1951

2,569,268

UNITED STATES PATENT OFFICE 2,569,268

PHASE SENSITIVE MEASURING AND CONTROLLING APPARATUS

Rudolf F. Wild, Philadelphia, Pa., assignor, by mesne assignments, to Minneapolis-Honeywell Regulator Company, Minneapolis, Minn., a corporation of Delaware Application August 13, 1947, Serial No. 768,469

18 Claims. (Cl. 318—29)

1

The present invention relates to measuring and control apparatus of the type in which a measuring bridge circuit is energized by a relatively high frequency current and is unbalanced by changes in bridge resistance resulting from changes in the value of the quantity measured, and the general object of the present invention is to provide improved means for determining the value of said quantity from a relatively high frequency bridge output signal.

More specifically, the object of the present invention is to provide relatively simple and effective means for deriving from the bridge energizing source two voltages of a frequency which is high compared to a 60 cycle supply voltage frequency and which differ in phase from one another, and for augmenting one and diminishing the other of the derived voltages by an amount depending on the magnitude of bridge unbalance. Which of the two derived voltages is thus augmented, depends upon the direction of bridge unbalance.

A further specific object of the present invention is to provide simple and effective means for deriving from the two said high frequency voltages two opposed unidirectional voltage signals which are respectively proportional to the two high frequency voltages, which pulsate at a relatively low frequency, such as 60 C. P. S. (cycles per second), and which respectively correspond in phase to the two derived high frequency voltages. The two low frequency pulsating voltages may be combined to produce a low frequency drive signal of a phase corresponding to the phase of the high frequency bridge unbalance signal. Such a drive signal may be used to actuate a follow-up mechanism for rebalancing the bridge, or for producing a controlling or measuring effect selectively dependent on the bridge unbalance.

In preferred forms of the present invention, the two unequal high frequency voltages derived, as above described, are separately rectified in a circuit arrangement of the phase discrimination type, in which the rectifier output circuits are so connected that a total or resultant unidirectional voltage is obtained which is equal to the difference of the individual rectified voltages. Means are also provided either periodically to interrupt the rectification, or to interrupt the application of the voltages derived from the oscillator to a circuit arrangement in which rectification is effected. In the first case, obviously, no output signal is obtained during the interval in which rectification is totally interrupted. In the second case, in which the application of one pair of voltages is interrupted while the bridge unbalance signal is still being applied to the circuit and rectified therein, the resultant output voltage is also zero, because the individual rectified voltages are then equal and opposite in polarity.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Of the drawings:

Fig. 1 is a diagram illustrating one embodiment of the invention;

Fig. 1A is a diagram illustrating a modification of a detail of the apparatus shown in Fig. 1;

Fig. 2 is a diagram illustrating a modification of the apparatus shown in Fig. 1;

Fig. 3 is a diagram illustrating another modification of the apparatus shown in Fig. 1;

Fig. 4 is a diagram illustrating a modification of a portion of the apparatus shown in Fig. 3; and Fig. 5 is a diagram illustrating means for amplifying the bridge unbalancing signal.

In Fig. 1 of the drawings, I have diagrammatically illustrated, by way of example, an embodiment of the invention in which an oscillator A, which may be of known type and has output terminals 1 and 2, is employed to generate a high frequency current having a frequency which may well be of the order of 20,000 C. P. S. The primary winding 3 of a transformer C is connected across output terminals 1 and 2 of the oscillator A. The secondary winding 4 of the transformer C energizes a measuring bridge circuit B comprising arms 5, 5a, 6 and 6a and a rebalancing resistor 7a. The arms 5 and 5a are connected in series between one terminal of the secondary winding 4 and one end of the resistor 7a, and have their junction point connected to ground by a conductor 7. The bridge arms 6a and 6 are connected in series between the one terminal of the transformer secondary winding 4 and the other end of the resistor 7a. The bridge arms 5 and 6a are each connected to the said one terminal of the winding 4, and the bridge arms 5a and 6 are each connected to a respective end of the resistor 7a. The second terminal of the secondary winding 4 is connected to a sliding contact 7' which is in engagement with the resistor 7a. The bridge arms 5 and 6 of the bridge B have resistance values which vary with the value of the quantity to be measured. Thus, for example, the resistors 5 and 6 may be the variable resistance elements of gas analysis apparatus of the well known thermal conductivity type. Alternatively, the bridge B may be a so-called oxygen bridge for determining the oxygen content of the atmosphere enveloping the resistors 5 and 6 from the paramagnetic characteristics of the oxygen in the general manner disclosed and claimed in the Dyer application, Serial No. 687,423, filed July 31, 1946. The oxygen bridge of said prior application is energized by high frequency alternating current supplied by an oscillator of a type suitable for use as the oscillator A of the apparatus shown in Fig. 1.

The common junction point of the bridge arms 5 and 5a of Fig. 1 is connected to ground by a conductor 7 as previously mentioned, and the common junction point 8 of the bridge arms 6 and 6a is connected by a conductor 8' and coupling condenser 9 to the center tap 10b of the secondary winding of a transformer CA, said secondary winding of the transformer CA comprising two series-connected sections 10 and 10a. The primary winding 11 of the transformer CA is connected between the output terminals 1 and 2 of the oscillator A. In Fig. 1, the remote ends of the secondary winding sections 10 and 10a are connected to the control grids of electronic triode valves D and Da, respectively, and the anodes of the valves D and Da are energized by alternating current of low frequency, for example 60 C. P. S., supplied by the secondary winding 13 of a transformer CB. The primary winding 12 of the transformer CB may be connected to low frequency alternating current supply conductors L' and L². The cathodes of the valves D and Da are connected by resistors 14 and 14a which are of equal value and are connected in series between the two cathodes. The junction point of the resistors 14 and 14a is connected by a conductor 13' to the terminal of the winding 13 which is remote from the anodes of the valves D and Da, and is connected through a resistor 15 to the center tap 10b of the secondary winding of transformer CA. The resistors 14 and 14a are shunted by separate high frequency by-pass condensers 16. The terminal of the resistor 14a which is connected to the cathode of the triode Da is connected to ground at 17.

The transformer CA, valves D and Da, and associated resistors and condensers constitute a phase discriminator circuit E. The output terminals of the phase discriminator circuit E are the ground connection 17 to the cathode of the valve Da, and the conductor 18 which is connected to the cathode of the valve D. In consequence of the connection, including the coupling condenser 9, between the bridge terminal 8 and the center tap 10b, the bridge unbalance signal appears across the resistor 15. The voltages normally applied to the control grids of the valves D and Da thus consist of the bridge unbalance signal, developed across the resistor 15, and the voltages across the respective individual halves 10 and 10a of the secondary winding. Depending upon the direction in which the bridge is unbalanced, the bridge unbalance signal will thus be in phase with the voltage across one or the other of the secondary winding sections 10 and 10a. Consequently, when the bridge is unbalanced, the grid voltage of one of the valves D and Da will be greater than the grid voltage of the other valve, and the opposing unidirectional voltages developed across the series resistors 14 and 14a will be unequal. The resultant of the unidirectional voltages across the series connected resistors 14 and 14a will have a polarity which is dependent upon the phase relation of the bridge unbalancing signal to the voltages across the sections 10 and 10a of the secondary winding of the transformer CA.

In the operation of the apparatus shown in Fig. 1, the electronic valves D and Da operate as rectifiers of the anode currents supplied by the transformer secondary 13, and the rectified currents are modified as a result of the high frequency signal voltages impressed on the control grids of the valves. The high frequency signal impressed on the control grid of each valve comprises the voltage induced in the corresponding section 10 or 10a of the secondary winding of the transformer CA, plus or minus the bridge unbalance output voltage depending on the phase of the bridge unbalance signal. That signal will be in phase with, and hence will be added to, the voltage induced in one of the sections 10 and 10a, and will be 180° out of phase with, and hence subtracted from, the voltage induced in the other section. The interruption of the anode current in each of the valves D and Da during one half of each cycle of the low frequency current supplied by the secondary winding 13 of the transformer CB interrupts the current flow through each of the valves during each low frequency half cycle in which the anodes of the valves go negative relative to the associated cathodes. In consequence, the rectified current flow through each valve is a unidirectional current pulsating with the 60 C. P. S. frequency of the voltage across the supply conductors L' and L². By grid rectification, the valves D and Da also rectify or detect the high frequency signals applied to their control grids, and this rectification or detection is interrupted each time that the anode currents flowing in the valves are interrupted.

In any case in which the application of alternating voltage to the anodes of the triodes D and Da is found unsatisfactory for periodic interruption of the detection effects of the valves, the latter may be replaced by valves having two control grids, as shown in Fig. 1A. In such an arrangement, the end terminals of the secondary windings 10 and 10a are connected to the grids which are relatively remote from the cathodes of the valves, and means are included for applying a 60 C. P. S. voltage to the control grid adjacent the cathode of each valve so as thereby to make each valve non-conductive during half cycles of the low frequency voltage cycles impressed on the last mentioned grids. Thus, as shown in Fig. 1A, the grid adjacent the cathode of each of the multigrid valves D' and Da' of the phase discriminator E' is connected to the cathode of the valve by a secondary winding 13A of the transformer CB, a source of unidirectional voltage 13B in series therewith, and one of the resistors 14 and 14a. The voltage source 13B and secondary winding 13A are arranged to bias both valves to cut-off during all or the major portion of one half of each cycle of the voltage induced in the winding 13A without making the grids connected to the winding 13A unduly positive relative to their cathodes during the remaining halves of each cycle. A suitable source of direct current is connected between the anodes and associated cathodes of the valves D' and Da'.

The phase discriminator circuits E and E' are well adapted for use in actuating or controlling a servo-motor or follow-up mechanism, which may be used for various measuring or control purposes. As diagrammatically shown in Fig. 1, the output terminals 17 and 18 of the discriminator E are operatively connected to the input of the energizing circuit of an electric servo-motor F which rotates, when the bridge B is unbalanced, in a direction dependent upon the phase relation between the bridge unbalance signal and the high frequency signal applied to the primary winding 11 of the transformer CA. As diagrammatically shown, the motor F and its energizing circuit are of a type now in extensive use in conversion type potentiometers and for other control purposes. By means of a suitable mechanical linkage F'', rotation of the motor F imparts motion to the sliding contact 7' of the bridge rebalancing resistor 7a for the purpose of automatically rebalancing the bridge B as will be hereinafter explained.

The motor F comprises a rotor 19 and stationary field windings 20 and 21. Field winding 20 is connected in series with a condenser 22 across the alternating current supply conductors L' and L² which supply energizing current to the primary winding of the transformer CB. The motor winding 21 is connected in parallel with a tuning condenser 23 between a ground connection 24 and the center tap 25 of the secondary winding 26 of a transformer CC which has its primary winding 27 energized from the alternating current supply conductors L' and L². One end terminal of the secondary winding 26 is connected to the anode of a triode G, and the other end terminal of said winding is connected to the anode of a triode H. The cathodes of the triodes G and H are connected to ground through a common resistor 28. The control grids of the valves G and H are each connected to the output terminal 18 of the phase discriminator E.

In the normal operation of the apparatus shown in Fig. 1, unbalance of the measuring bridge B results in a pulsating voltage difference between the discriminator terminals 17 and 18 having a frequency of 60 pulses per second. That potential difference is impressed on the input circuit of each of the valves G and H. The phase of the voltage difference between the terminals 17 and 18, and the phases of the voltages supplied to the anodes of the valves G and H by the transformer secondary 26, are each related to the phase of the voltage across the alternating supply conductors L' and L². The voltages impressed on the anodes of the valves G and H are displaced from one another by 180°, and one of these voltages is substantially in phase with, and the other of these voltages is substantially 180° out of phase with, the voltage between the terminal 18 and the grounded terminal 17. Which of said anode voltages is in phase with the discriminator output voltage depends upon the direction of unbalance of the bridge B.

When a voltage difference exists between the discriminator output terminals 17 and 18, the valve G or H having its anode voltage in phase with the voltage between the terminals 17 and 18 passes more 60 C. P. S. alternating current through the motor control winding 21 than does the other valve, and thereby effects the rotation of the motor in a direction opposite to that in which the motor rotates when the major portion of the alternating current supplied to the winding 21 is supplied by said other valve. The above-mentioned conversion type potentiometer is disclosed in the Wills Patent No. 2,423,540, granted July 8, 1947, and is also disclosed in the Wills Patent No. 2,385,481, granted September 5, 1945. Consequently, further explanatory reference herein to the form and operation of the means diagrammatically illustrated for effecting the normal operation of the motor F seem unnecessary.

Those skilled in the art will understand that the motor F, energized and controlled in the manner illustrated diagrammatically in Fig. 1, may be used for many purposes. Merely by way of illustration and example, the motor F is shown in Fig. 1 as being mechanically coupled to the sliding contact 7' of the bridge rebalancing resistor 7a as noted above. Through this connection, the motor F is operative to rebalance the bridge B whenever the latter is unbalanced by a change in the resistance values of the bridge arm resistors 5 and 6 corresponding to a change in the value of the quantity being measured. Such a change in resistance of the bridge resistors 5 and 6 causes an alternating current of one phase or of the opposite phase to flow through the winding 21 of the motor F, the latter being driven thereby in a corresponding direction to effect movement of the sliding contact 7' along the bridge resistor 7a in the direction and to the extent necessary to rebalance the bridge B. Thus the system illustrated in Fig. 1 is of the self-balancing bridge type. It is noted that if the bridge resistors 5 and 6 form part of a gas analysis apparatus of the thermal conductivity type, the motor F may be used to adjust a valve and thereby vary the composition of the gas analyzed so as to restore the bridge to balance.

The general principles of the present invention may be embodied in apparatus differing in various ways from the apparatus shown diagrammatically in Figs. 1 and 1A, and in Figs. 2, 3, and 4 I have illustrated three different modifications of the apparatus shown in Fig. 1. The apparatus shown in Fig. 2 differs from that shown in Fig. 1 in two important respects: (1) In Fig. 2, the anodes of the valves D and Da are energized by direct current, as by connecting the anodes to the positive terminal I of a source of direct current which has its negative terminal i connected to the junction of the resistors 14 and 14a. (2) In Fig. 2, the oscillator terminals 1 and 2 are connected to the terminals of the primary winding 11 of the transformer CA through a pentode amplifier J, and the conductivity of the latter is periodically interrupted at a suitably low frequency thereby to produce a low frequency pulsating signal in the output circuit of the discriminator E. The signal pulsation thus produced is like the signal pulsation produced in Fig. 1 by virtue of the fact that the anodes of the valves D and Da are connected in Fig. 1 to one terminal of the secondary winding of the transformer CB. The apparatus shown in part in Fig. 2 may include an oscillator A and a bridge B exactly like the oscillator and bridge shown in Fig. 1, but in Fig. 2, only the terminals 1 and 2 of the oscillator and the output terminal 8 of the bridge B are shown.

In Fig. 2, the anode of the pentode J is connected through the transformer primary 11 to the positive terminal I' of a source of direct current having its negative terminal i' grounded. The cathode of the pentode J is connected to ground through the cathode and anode of a diode valve K and the secondary winding 30 of a transformer CD. The primary winding 31 of the transformer CD is connected to the low frequency alternating current supply conductors L' and L², oscillator terminal 1 is connected to the cathode of the pentode J through a resistance 32, and the oscillator terminal 2 is connected to the control grid of the pentode J through a condenser 33. Said control grid is connected to ground through a resistor 34. The screen grid of the pentode J is connected to the positive D. C. supply terminal I' through a resistance 35, and is also connected to ground through a condenser 36. The suppressor grid of the pentode J is connected to the cathode of the pentode.

In operation, during the low frequency half cycles in which the transformer CD makes the diode K conductive, the potential of the cathode of the pentode valve J, directly connected to the cathode of the diode K, is made sufficiently positive relative to the control grid of the valve J to make the latter non-conductive. In consequence, the current flow through the primary winding 11 of the transformer CA is a unidirectional current comprising pulses of the high frequency signal produced by the oscillator A and pulsating with a frequency of 60 C. P. S. The output signal which is produced between the terminals 18 and 17 of the discriminator circuit E of Fig. 2 is therefore a pulsating unidirectional current as it was for the apparatus of Fig. 1.

The form of the invention shown in Fig. 3 differs from the form shown in Fig. 2 only in respect to the character of the phase discriminator circuit. In the phase discriminator EA, shown in Fig. 3, the triodes D and Da of Figs. 1 and 2 are replaced by diodes L and La, respectively. The remote end terminals of the secondary winding sections 10 and 10a are connected to the anodes of the valves L and La, respectively. With the arrangement shown in Fig. 3, the separate D. C. supply connection through the discriminator circuit EA is omitted. This simplification of the apparatus does not result in any general difference in operation between the forms of the invention shown in Figs. 2 and 3.

The form of the invention shown in Fig. 4 differs from the form shown in Figs. 2 and 3 in respect to the phase discriminator circuit portion of the apparatus. The phase discriminator arrangement EB, shown in Fig. 4, is like the circuit EA of Fig. 3 in its inclusion of diodes L and La having their anodes connected to the remote end terminals of the secondary winding sections 10 and 10a, respectively. In Fig. 4, however, the resistor 15 is omitted from the center tap connection 10b between the junction of the winding sections 10 and 10a and the junction of the resistors 14 and 14a connected between the output terminals 17 and 18 of the circuit EB.

In Fig. 4, the separate by-pass condensers 16 shown in Figs. 1, 1A, 2 and 3, are replaced by a single high frequency by-pass condenser 37 connected between the terminals 17 and 18 in shunt to the series connected resistors 14 and 14a. With the arrangement shown in Fig. 4, the high frequency signal from the bridge B which results from bridge unbalance is developed across the resistors 14 and 14a instead of being developed across the resistor 15 as it is in the arrangement shown in Figs. 1, 1A, 2 and 3.

With each of the forms of the invention shown in Figs. 1-4, the unbalance signal transmitted to the phase discriminator section through the bridge terminal 8 and coupling condenser 9 from the bridge B may advantageously be amplified for operation of said bridge at a relatively low voltage level. Thus, as shown in Fig. 5, a triode amplifying valve M may be connected between the bridge output terminal 8 and the center tap connection 10b to the secondary winding of the transformer CA. In Fig. 5, the bridge terminal 8 is connected to the control grid of the valve M, and the anode of that valve is connected to the center tap connection 10b of the secondary winding of the transformer CA through the condenser 9. The plate circuit of the valve M includes a battery or other energizing source 40 and a plate load resistor 41. The amplifier valve M of Fig. 5 can be adapted to produce a substantial change in the voltage to be produced by the phase discriminator circuit E, E', EA or EB for the smallest bridge unbalance signal which is to be detected. The greater the resulting voltage variation obtained for a small bridge unbalance signal, the smaller the tendency of the phase discriminator to drift. Such drift may be due to line voltage variations when the individual rectifier tubes used in the phase discriminator are dissimilar.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Measuring apparatus comprising a circuit network having an output portion and including impedance which varies in accordance with changes in a measured condition and thereby unbalances said network, a relatively high frequency signal generator having an output circuit which is connected to and energizes said network, the latter, when so energized, being operative to produce in said output portion an unbalance signal of a magnitude dependent upon the extent of network unbalance and of solely one phase or the opposite phase depending upon the direction of network unbalance, a transformer having a primary winding connected to said output circuit and energized with voltage of solely a predetermined one of said phases and having a secondary winding including a center-tap connection dividing said secondary winding into first and second halves, a first circuit means connecting a first detecting device and a first resistor in series with said first half of said secondary winding and said output portion and operative to produce across said first resistor a unidirectional voltage resulting from current flow through said first detecting device and having a magnitude dependent upon that of the resultant of the voltage across said first half of said secondary winding and said unbalance signal, a second circuit means connecting a second detecting device and a second resistor in series with said second half of said secondary winding and said output portion and operative to produce across said second resistor a unidirectional voltage resulting from current flow through said second detecting device and having a magnitude dependent upon that of the resultant of the voltage across said second half of said secondary winding and said unbalance signal, the latter being substantially in phase with the voltage across one of said halves of said secondary winding and being substantially 180° out of phase with the voltage across the other of said halves of said secondary winding, and modifying means operative to modify periodically said current flow through said detecting devices at a relatively low frequency, whereby the resultant of said voltages produced across said resistors is a relatively low frequency voltage signal dependent in magnitude and phase upon the respective magnitude and phase of said unbalance signal.

2. Apparatus as specified in claim 1, including means responsive to the phase and magnitude of said relatively low frequency signal and operative to rebalance said network, said responsive means including an input portion connected across said resistors and an output portion coupled to said network.

3. Apparatus as specified in claim 1, including an electronic amplifier included in said connection between said primary winding and said generator output circuit, said amplifier having an input portion connected to said output circuit and having an output portion connected to said primary winding, and wherein said modifying means includes a device adapted to be connected to a source of alternating voltage of said relatively low frequency and operative to reduce substantially the conduction of current through said amplifier during a portion of each cycle of said relatively low frequency alternating voltage, whereby the application to said primary winding of said voltage which energizes the latter is periodically modified at said relatively low frequency.

4. Apparatus as specified in claim 3, wherein said amplifier includes a first electronic valve having a grid and a cathode included in said amplifier input portion and having an anode included with said cathode in said amplifier output portion, a pair of supply terminals adapted to be connected to a source of unidirectional anode supply voltage, and a cathode resistor, wherein said device includes a pair of energizing terminals adapted to be connected to said source of relatively low frequency alternating voltage and includes a diode electronic valve having an anode and a cathode, and wherein there are included means connecting said cathode resistor between the cathode of said first valve and one of said supply terminals and connecting said primary winding between the other of said supply terminals and the anode of said first valve, and means connecting together the cathodes of said valves, connecting the anode of said diode valve to one of said energizing terminals, and connecting the other of said energizing terminals to said one of said supply terminals.

5. Measuring apparatus comprising a circuit network having an output portion and including impedance which varies in accordance with changes in a measured condition and thereby unbalances said network, a relatively high frequency signal generator having an output circuit which is connected to and energizes said network, the latter, when so energized, being operative to produce in said output portion an unbalance signal of a magnitude dependent upon the extent of network unbalance and of solely one phase or the opposite phase depending upon the direction of network unbalance, a transformer having a primary winding connected to said output circuit and energized with voltage of solely a predetermined one of said phases and having a secondary winding including a center-tap connection dividing said secondary winding into first and second halves, each having a respective end terminal, a first detecting device having at least two terminals, a first resistor having one end terminal connected to one of the terminals of said first detecting device, a second detecting device having at least two terminals, a second resistor having one end terminal connected to one of the terminals of said second detecting device, the end terminals of said resistors remote from the respective detecting devices being connected together at a junction, a first circuit means connecting said first half of said secondary winding, said output portion, and said first resistor across said first detecting device and including a common connection between said junction and said center-tap connection and a connection between the end terminal of said first half of said secondary winding and another of the terminals of said first detecting device, said first circuit means being operative to produce across said first resistor a unidirectional voltage resulting from current flow through said first detecting device and having a magnitude dependent upon that of the resultant of the voltage across said first half of said secondary winding and said unbalance signal, a second circuit means connecting said second half of said secondary winding, said output portion, and said second resistor across said second detecting device and including said common connection and a connection between the end terminal of said second half of said secondary winding and another of the terminals of said second detecting device, said second circuit means being operative to produce across said second resistor a unidirectional voltage resulting from current flow through said second detecting device and having a magnitude dependent upon that of the resultant of the voltage across said second half of said secondary winding and said unbalance signal, the latter being substantially in phase with the voltage across one of said halves of said secondary winding and being substantially 180° out of phase with the voltage across the other of said halves of said secondary winding, and modifying means operative to modify periodically said current flow through said detecting devices at a relatively low frequency, whereby the resultant of said voltages produced across said resistors is a relatively low frequency voltage signal dependent in magnitude and phase upon the repsective magnitude and phase of said unbalance signal.

6. Apparatus as specified in claim 5 wherein each of said detecting devices includes an electronic valve having anode and cathode elements and at least one grid element, wherein the cathode of each of said valves is connected to said one terminal of the respective one of said detecting devices and hence to said one end terminal of the respective one of said resistors, wherein the grid of each of said valves is connected to said another terminal of the respective one of said detecting devices and hence to said end terminal of the respective one of said halves of said secondary winding, and wherein there are included a pair of terminals adapted to be connected to a source of anode current, a connection between one of the last mentioned terminals and the anodes of said valves, and a connection between the other of said last mentioned terminals and said junction.

7. Apparatus as specified in claim 6, wherein said modifying means includes a device adapted to be connected to a source of alternating voltage of said relatively low frequency and operative to reduce substantially the magnitude of said primary winding energizing voltage during a portion of each cycle of said relatively low frequency alternating voltage, whereby the current flow through said valves is periodically modified at said relatively low frequency.

8. Apparatus as specified in claim 5, wherein each of said detecting devices includes an electronic valve having anode and cathode elements and at least one grid element, wherein the cathode of each of said valves is connected to said one terminal of the respective one of said detecting devices and hence to said one end terminal of the respective one of said resistors, wherein the grid of each of said valves is connected to said another terminal of the respective one of said detecting devices and hence to said one end terminal of the respective one of said halves of said secondary winding, and wherein said modifying means includes a pair of energizing terminals adapted to be connected to a source of alternating voltage of said relatively low frequency, a connection between one of the last mentioned terminals and said junction, and a connection between the other of said last mentioned terminals and another element of each of said electronic valves, said modifying means being operative to reduce substantially the conduction of current through both of said valves simultaneously during a portion of each cycle of said relatively low frequency alternating voltage, whereby the current flow through said valves is modified periodically at said relatively low frequency.

9. Apparatus as specified in claim 8, wherein said connection to said other of said energizing terminals connects the last mentioned terminal to the anode of each of said valves, and wherein said relatively low frequency alternating voltage constitutes the anode energizing voltage for said valves.

10. Apparatus as specified in claim 8, wherein each of said valves includes a second grid element, wherein said connection to said other of said energizing terminals connects the last mentioned terminal to the second grid of each of said valves, and wherein there are included a second pair of terminals adapted to be connected to a source of unidirectional anode energizing voltage, a connection between one of said second pair of terminals and the anodes of said valves, and a connection between the other of said second pair of terminals and said junction.

11. Apparatus as specified in claim 5, wherein each of said detecting devices includes a diode electronic valve having an anode and cathode, wherein the cathode of each of said valves is connected to said one terminal of the respective one of said detecting devices and hence to said one end terminal of the respective one of said resistors, wherein the anode of each of said valves is connected to said another terminal of the respective one of said detecting devices and hence to said end terminal of the respective one of said halves of said secondary winding, and wherein said modifying means includes a device adapted to be connected to a source of alternating voltage of said relatively low frequency and operative to reduce substantially the magnitude of said primary winding energizing voltage during a portion of each cycle of said relatively low frequency alternating voltage, whereby the current flow through said valves is periodically modified at said relatively low frequency.

12. Apparatus as specified in claim 11, wherein said output portion of said network includes a resistor connected in said common connection between said junction and said center-tap connection, wherein a first by-pass condenser for signals of said relatively high frequency is connected in parallel with said first resistor, and wherein a second by-pass condenser for signals of said relatively high frequency is connected in parallel with said second resistor.

13. Apparatus as specified in claim 11, wherein said output portion of said network includes first and second output terminals between which said unbalance signal is adapted to appear, a connection between said first output terminal and said center-tap connection and a connection between said second output terminal and said one end terminal of one of said resistors, and wherein a single by-pass condenser for signals of said relatively high frequency is connected between said one end terminal of said first resistor and said one end terminal of said second resistor.

14. Measuring apparatus comprising a circuit network having an output portion and including impedance which varies in accordance with changes in a measured condition and thereby unbalances said network, a relatively high frequency signal generator having an output circuit which is connected to and energizes said network, the latter, when so energized, being operative to produce in said output portion an unbalance signal of a magnitude dependent upon the extent of network unbalance and of solely one phase or the opposite phase depending upon the direction of network unbalance, a transformer having a primary winding connected to said output circuit and energized with voltage of solely a predetermined one of said phases and having a secondary winding including a center-tap connection dividing said secondary winding into first and second halves, a first circuit means connecting at least a portion of a first rectifying device and a first resistor in series with said first half of said secondary winding and said output portion and operative to produce across said first resistor a unidirectional voltage resulting from current flow through said first rectifying device and having a magnitude dependent upon that of the resultant of the voltage across said first half of said secondary winding and said unbalance signal, a second circuit means connecting at least a portion of a second rectifying device and a second resistor in series with said second half of said secondary winding and said output portion and operative to produce across said second resistor a unidirectional voltage resulting from current flow through said second rectifying device and having a magnitude dependent upon that of the resultant of the voltage across said second half of said secondary winding and said unbalance signal, the latter being substantially in phase with the voltage across one of said halves of said secondary winding and being substantially 180° out of phase with the voltage across the other of said halves of said secondary winding, and modifying means operative to modify periodically said current flow through said rectifying devices at a relatively low frequency, whereby the resultant of said voltages produced across said resistors is a relatively low frequency voltage signal dependent in magnitude and phase upon the respective magnitude and phase of said unbalance signal.

15. Measuring apparatus comprising a circuit network including impedance which varies in accordance with changes in a condition and thereby produces a relatively high frequency network unbalance signal solely of one phase or the opposite phase when said network is unbalanced, a pair of terminals adapted to be connected to a source of relatively high frequency energizing voltage, connections between said terminals and said network operative to apply said energizing voltage to said network to energize the latter, means connected to said terminals and operative to derive therefrom two relatively high frequency voltages of substantially constant phase and substantially 180° out of phase with one another, circuit means operative to add said unbalance signal to each of said derived voltages, detecting means connected to the first mentioned means and operative to produce a separate output voltage of a magnitude dependent upon that of the resultant of each of said derived voltages and said unbalance signal, means operative to combine said output voltages, and means operative to modify periodically each of said output voltages to form a resultant relatively low frequency pulsating voltage.

16. Measuring apparatus comprising a normally balanced measuring circuit network including impedance which varies in accordance with changes in a condition and thereby unbalances said network, a pair of terminals adapted to be connected to a source of relatively high frequency voltage, connections between said terminals and said network operative to apply said voltage to said network to energize the latter, a translating circuit having an output circuit and having an input circuit connected to said network and to which there is applied from said network a relatively high frequency unbalance signal solely of one phase or the opposite phase, depending upon the direction of unbalance of said network, and of a magnitude dependent upon the extent of network unbalance, said translating circuit including means connected to said terminals and operative to derive therefrom two relatively high frequency voltages of substantially constant and opposite phase, circuit means operative to add said unbalance signal to each of the last mentioned two voltages, detecting means connected to said connected means and operative to produce a separate output voltage of a magnitude dependent upon that of the resultant of each of said last mentioned two voltages and said unbalance signal, and means operative to combine said output voltages, other means operative to interrupt periodically each of said output voltages before their combination for producing in the output circuit of said translating means a relatively low frequency signal of a phase and magnitude respectively in accordance with the direction and extent of unbalance of said network, and means responsive to the phase and magnitude of said relatively low frequency signal and operative to rebalance said network.

17. Measuring apparatus comprising in combination, a measuring bridge circuit including impedance which varies in accordance with a change in a condition and thereby produces a high frequency bridge unbalance signal solely of one phase or of the opposite phase when said bridge circuit is unbalanced, a high frequency oscillator having an output circuit which is connected to and energizes said bridge circuit, means connected to said oscillator and arranged to derive therefrom two high frequency voltages of substantially constant phase and substantially 180° out of phase with one another, circuit means for adding said unbalance signal to each of said voltages, rectifying means connected to the first mentioned means and operative to produce a separate rectified voltage of a magnitude dependent on that of the resultant of each of the first mentioned voltages and said unbalance signal, means for combining said rectified voltages, and means for periodically modifying each of the rectified voltages before their combination to form a resultant pulsating voltage.

18. Measuring apparatus comprising in combination, a normally balanced measuring network including impedance means which varies in value in accordance with changes in a variable condition and thereby unbalances said network, a source of high frequency voltage having an output circuit which is connected to and energizes said network, a translating circuit having an output circuit and having an input circuit connected to said network and to which there is applied from said network a high frequency unbalance signal of one phase or the opposite phase, depending upon the direction of unbalance of said network, and of a magnitude dependent upon the extent of network unbalance, said translating circuit including means connected to the output circuit of said source and arranged to derive therefrom two high frequency voltages of substantially constant and opposite phase, circuit means for adding said unbalance signal to each of the last mentioned two voltages, rectifying means connected to said connected means and operative to produce a separate rectified voltage of a magnitude dependent on that of the resultant of each of said last mentioned two voltages and said unbalance signal, means operative to combine said rectified voltages, other means operative to interrupt periodically each of said rectified voltages before their combination for producing in the output circuit of said translating means a relatively low frequency signal of a phase and magnitude respectively in accordance with the direction and extent of unbalance of said network, and means responsive to the phase and magnitude of said relatively low frequency signal and operative to rebalance said network.

RUDOLF F. WILD.

REFERENCES CITED

The following references are of record in the file of this patent:

UNITED STATES PATENTS

| Number | Name | Date |
|---|---|---|
| 2,183,725 | Seeley | Dec. 19, 1939 |
| 2,256,487 | Moseley et al. | Sept. 23, 1941 |
| 2,379,689 | Crosby | July 3, 1945 |
| 2,424,568 | Isbister et al. | July 29, 1947 |
| 2,433,195 | Bond | Dec. 23, 1947 |
| 2,436,807 | Isbister | Mar. 2, 1948 |
| 2,438,288 | Jacobson et al. | Mar. 23, 1948 |
| 2,462,630 | Gille | Feb. 22, 1949 |
| 2,476,496 | Kliever | July 19, 1949 |
| 2,476,849 | Ergen | July 19, 1949 |